United States Patent [19]

Wallman

[11] 3,747,407

[45] July 24, 1973

[54] PROBE MOUNTED ELECTRONICS FOR FUEL GAGE SYSTEM

[75] Inventor: Irwin Wallman, Great Neck, N.Y.

[73] Assignee: Consolidated Airborne Systems, Inc., Carle Place, N.Y.

[22] Filed: Nov. 26, 1971

[21] Appl. No.: 202,512

[52] U.S. Cl. ............... 73/304 C, 324/61 R, 331/65, 331/113 R
[51] Int. Cl. ........................................... G01f 23/26
[58] Field of Search ................. 73/304 C; 324/61 R; 331/65, 113 R

[56]  References Cited
UNITED STATES PATENTS

| | | | |
|---|---|---|---|
| 3,375,716 | 4/1968 | Hersch | 73/304 C |
| 3,161,054 | 12/1964 | Cohn | 73/304 C |
| 3,638,491 | 2/1972 | Hart | 73/304 C |

Primary Examiner—Richard C. Queisser
Assistant Examiner—Denis E. Corr
Attorney—Leonard H. King

[57]  ABSTRACT

A capacitance fuel gaging system having a probe which includes a capacitor whose capacitance is dependent on the level of the fuel and capacitance to DC current conversion means. A DC supply is externally connected to the probe for energizing the conversion means, and an indicator is externally connected to the probe for displaying the output.

9 Claims, 5 Drawing Figures

3,747,407

3,747,407

PROBE MOUNTED ELECTRONICS FOR FUEL GAGE SYSTEM

The aforementioned abstract is neither intended to define the invention of the application which, of course, is measured by the claims, nor is it intended to be limiting as to the scope of the invention in any way.

This invention relates to capacitance fuel gauge systems and, more particularly, to a capacitance fuel gauge probe having system electronics mounted in conjunction with the probe.

BACKGROUND OF THE INVENTION

Capacitance fuel gauging systems are widely used for indicating the volume as well as the mass of fuel contained within fuel tanks. Such systems are especially useful on aircrafts. A probe unit is inserted into the fuel tank and comprises two plates whose capacitance varies as a function of the liquid level as well as the dialectric constant of the fuel. The probe is generally constructed of a pair of coaxial conductive cylinders which form the capacitor, although the technique is not limited to a cylindrical configuration. In order to measure the volume of fuel, the probe capacitor is connected as one arm of a bridge circuit which has a reference capacitor connected in the other arm. The remaining two arms are formed from a tapped secondary winding of a transformer whose primary winding is connected to an AC source. An intermediate tap on the transformer's secondary winding is connected to ground. A follow-up potentiometer tapped across a portion of the secondary may be inclined for servomotor feedback. The output is taken off between ground and the midpoint of the two capacitors. Connected across the output is an amplifier, connected to a demodulator which provides the system output and is read on an indicator. In some configurations, the output from the demodulator controls the servomotor which drives the tap on the follow-up potentiometer to rebalance the circuit and the rebalancing is read on an output device.

Basically, the reason which necessitated using a bridge circuit for readout of the tank capacitor is that there existed leakage paths from the capacitor to ground on either side of the tank capacitor. Also, cable loading from the capacitor to the measuring devices had to be effectively compensated for, to provide accurate readings of the tank capacitance. A bridge circuit effectively provided the necessary compensation for cable loading and capacitance leakage paths by balancing out the losses prior to the use of the probe.

Because of this necessity for using the bridge circuit and the equipment in conjunction therewith, the gauging system required excessive space and weight and required remote mounting of the electronic circuitry from the probe unit. Typically, bridge units, amplifiers, indicators, and other circuitry were provided as separate units to permit interchangeability and replaceability with various probe units.

It is, therefore, an object of this invention to provide a capacitor probe unit for fuel gauge measurement wherein the capacitor variations can be read without the need of a bridge circuit.

A further object of the invention is to provide a capacitor fuel gauging system not affected by cable loading and capacitance leakage to ground.

Yet another object of the invention is to provide a capacitance type fuel gauging system having the electronics required for measuring built into the probe and requiring only an external D.C. power source and an external indicator.

A further object of the invention is to provide a capacitance fuel gauging system wherein the tube to ground impedance of the probe will not affect the accuracy of the capacitance measurement.

Still a further object of the invention is to provide a capacitance fuel quantity measuring system having the measuring electronics located at the probe and including an empty adjustment directly on the probe.

A further object of the invention is to provide a capacitance fuel gauging system including measuring electronics located at the probe and not requiring shielded wires leading from the probe unit.

Still a further object of this invention is to provide a capacitance type fuel gauging system having electronics located at the probe and requiring a DC source of energy.

A further object of the invention is to provide a capacitor fuel gauging system wherein a plurality of probe units can be connected in parallel with a DC source of power.

Yet another object of the invention is to provide a capacitor type fuel gauging system having electronics for measuring the capacitance wherein the electronics is located at the probe and includes a pulsing network.

Still a further object of the invention is to provide a capacitor fuel quantity measuring system including a free running multivibrator located at the probe unit.

Still a further object of the invention is to provide a capacitor fuel gauging system which includes electronics for measuring the change in capacitance, the electronics located at the probe unit and including an empty adjustment which does not require further readjustment after installation of the probe into the tank.

Still a further object of the invention is to provide a capacitor type fuel gauging system having electronics for measuring the change in capacitance incorporated on a printed circuit board and located within the probe unit.

SUMMARY OF THE INVENTION

Briefly, the invention provides a capacitance fuel gauging system having a probe consisting of a pair of conductive plates forming a capacitor whose capacitance is dependent on the liquid level in which the probe is inserted. Connected in the probe unit is a capacitance to DC current converter which includes a free running, high frequency multivibrator. In one embodiment, the tank capacitor is charged during one-half of the multivibrator output cycle and during the second half of the cycle, the charge is transferred to a fixed capacitor whose resulting charge is a direct function of the capacitive value of the tank capacitance. This charge is available for measurement on an ammeter whose scale is adjusted to read directly in fuel quantity.

In another embodiment, the tank capacitance is used as the base capacitor of one of the transistors in the free running multivibrator and thereby controls the width of the pulse of one-half of the output cycle of the multivibrator. A differential voltmeter can be connected to the output of the multivibrator which will then read directly as a function of the value of the capacitance which in turn is a direct reading of the fuel quantity.

In both embodiments, a further capacitor may be included to provide the empty adjustment for the probe unit. All of the measuring electronics are included directly in the probe unit and two wires are external to the probe, one for connecting the DC source to the probe and the other for connecting to the indicator. A ground wire is provided at the probe and the probe tube itself can be grounded if required. The frequency and peak amplitude of the multivibrator do not affect the accuracy of the output but merely the scale factor of the reading. Furthermore, pulse width and pulse shape within reasonable limits also do not affect accuracy. The impedance leakage of the tube to ground will also not affect accuracy but in certain cases may affect the scale and zero readings. Temperature effects are minimal at the empty state and are predictable, making it possible to reduce any temperature effects by means of a thermistor connected network.

The above brief description of the invention, together with the aforementioned objects, will be further explained with more particularity in the following, more detailed, description of the invention, taken in conjunction with the accompanying drawings, which form an integral part thereof.

DESCRIPTION OF THE INVENTION

Figure 1:
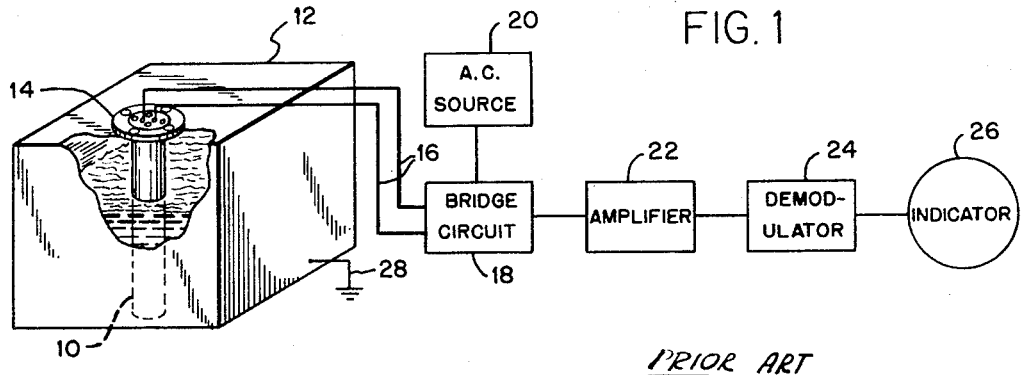
FIG. 1 represents a block diagram of the capacitor fuel quantity gauging systems of the prior art.

Referring to FIG. 1, there is shown a block diagram of the capacitor fuel quantity gauge system of the prior art. The system basically comprises a capacitor type tank probe 10 which is inserted into a fuel tank 12 and is generally supported by an upper flange 14 which connects to the fuel tank 12. The probe includes two plates, generally coaxial conductive cylinders which form a capacitor, whose capacitance is dependent on the liquid level and is measurable on a continuous basis. The probe may typically include a further capacitor for compensation purposes as is known in the art. Two externally shielded leads 16 connect the capacitance in the probe to an external bridge circuit 18 whereby the tank capacitance is incorporated as one arm of the bridge. The bridge circuit includes a reference capacitor in the second arm of the bridge, and a secondary winding wherein the primary winding is supplied by an AC source 20. An intermediate tap on the transformer's secondary winding is connected to ground and the output of the bridge is taken between ground and the junction of the two capacitors. A follow-up potentiometer tapped across a portion of the secondary may be included, wherein the reference capacitor would be connected between the wiper arm and the tank capacitance. A servomotor connected to the output of the bridge circuit would be mechanically connected to the wiper arm of the follow-up potentiometer to rebalance the potentiometer during the course of operation.

The output from the bridge circuit is typically passed through an amplifier 22, a demodulator 24 and an indicator 26. Other types of display devices are also used depending upon the type of reading desired and the purpose of measurement. A ground connection 28 is generally connected to the fuel tank 12.

As is evident, the cables 16 actually form part of one bridge arm including the tank capacitor. As a result, the cables provide additional loading, and leakage between the tank capacitor and the ground also provides additional parallel paths which must be accounted for. By using the bridge circuit, and typically a three-wire bridge circuit, many of the losses resulting from the cables as well as the leakage capacitance are compensated for by initially balancing the bridge before usage. Furthermore, the cables 16 are generally shielded to avoid any further stray capacitance losses. For this reason, all prior art systems require a bridge circuit for obtaining the output reading.

If cable loading can be eliminated, other circuits beside the bridge circuit could be used for measuring the change in capacitance value. To avoid the problem of cable loading and leakage capacitance, the electronics for measuring the change in capacitance is located directly at the probe unit and incorporated therein. Once the problem of cable loading is avoided, there is no longer the restriction of using the bridge circuit as in the prior art and more economical and compact electronics can be used which provide a capacitance to DC current conversion.

Figure 2:
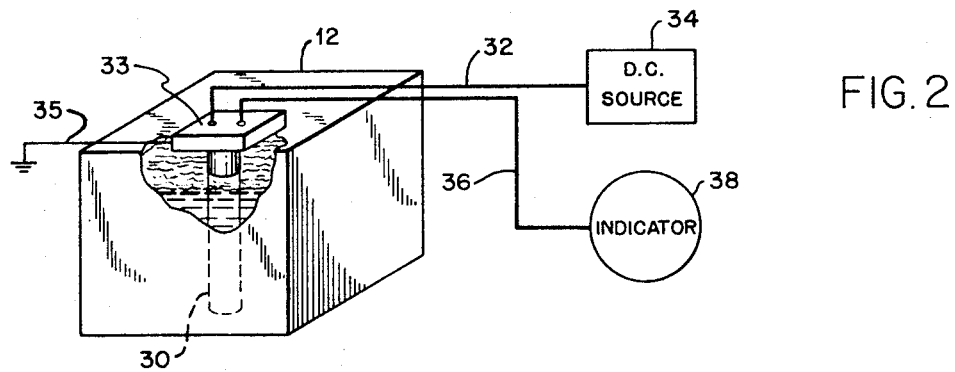
FIG. 2 represents a block diagram of the capacitor fuel gauging system of the present invention.

Referring now to FIG. 2, there is shown the capacitor fuel gauge system in accordance with this invention. The probe unit 30 includes the capacitor as in the prior art. However, included in the probe unit are the measuring electronics 33 including a pulsing network typically a free running, high frequency multivibrator. Two wires extend from the probe unit. One wire 32 for coupling a DC source 34 to the probe and the other wire 36 for coupling an indicator 38 to the output of the measuring electronics circuitry. A ground lead is required for the electronic circuitry 33. However, such ground lead can be provided by grounding the tube as shown at 35, or grounding the frame of the fuel tank. Since the leads 32, 36 are not included within the measuring electronics but merely provide transfer of a DC value, the leads do not have to be shielded.

Figure 4:
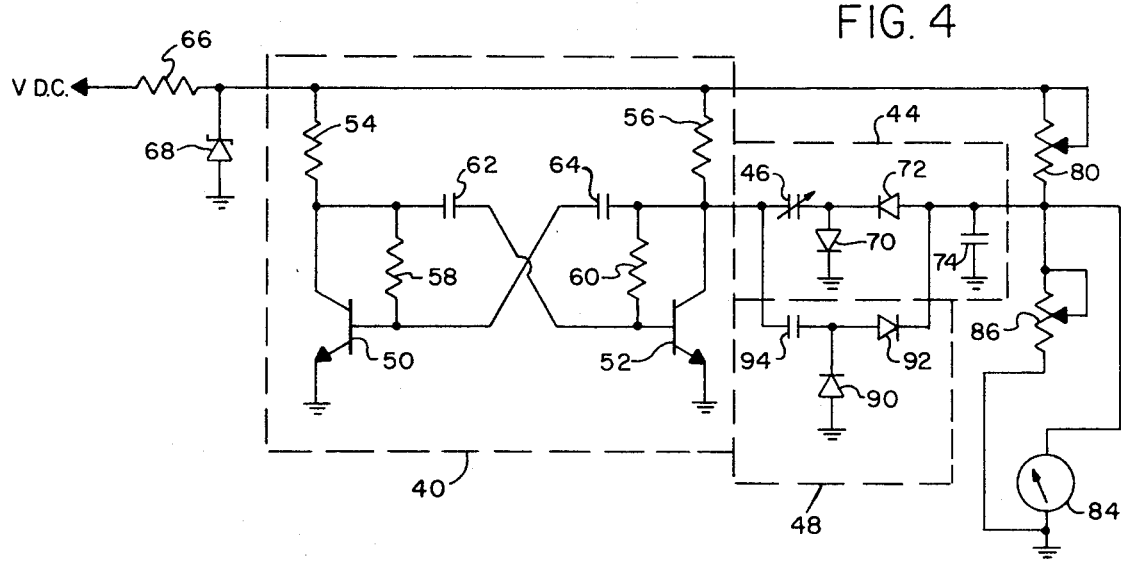
FIG. 4 is one embodiment of the measuring electronics incorporated within the probe unit in accordance with this invention.

Referring now to FIG. 4, there is shown one embodiment of the electronics circuitry including the pulsing network in accordance with this invention. The electronics circuitry includes an astable multivibrator 40, the measuring circuitry 44 including tank capacitor 46, and the compensation circuitry 48.

The astable multivibrator 40 includes transistors 50 and 52, each having grounded emitters and collector resistors 54, 56, respectively. The base-collectors are interconnected by means of an R-C network including resistors 58 and 60 and capacitors 62 and 64. A DC supply voltage is supplied across resistor 66 and zener diode 68 to energize the multivibrator. The tank capacitor 46 is connected to one of the collector outputs of the multivibrator. Diode 70 is connected between the other end of the tank capacitor and ground, in the direction as shown. Diode 72 is connected between this latter end of the tank capacitor 46 and a further capacitor 74 whose other end is grounded. Indicator 84 is connected between the output of the measuring circuitry 44 and ground. A full scale adjustment potentiometer 86 is connected in series with the indicator and the scale adjust can either be included within the meter itself or can be included within the electronics circuitry connected at the probe unit.

The high frequency, free running multivibrator has two output states, high and low. When the output from the collector of transistor 52 is high, the tank capacitor 46 is charged to the supply voltage through the diode 70. When the output from the multivibrator goes to its low state, the tank capacitor 46 is discharged into the capacitor 74 through diode 72. The charge on capacitor 74 is then available to drive a micro-ammeter 84 which will give a direct indication of the capacitance of capacitor 46. The reason for this is that the charge provided on to capacitor 74 results from the charge on capacitor 46 which equals the voltage from the supply voltage, which is constant, times the capacitance value of tank capacitor 46.

An amplifier (not shown) may be provided between the capacitor 74 and the meter 84. This amplifier is optional and for most applications is not needed. When it is used, a milli-ammeter would replace the micro-ammeter 84. Scale adjust 86 amy be initially adjusted to provide correct zero readings.

As with present capacitance bridge systems, it is necessary to balance the empty capacitance of the probe. This is done by means of network 48 in conjunction with the potentiometer 80 which is an inverse network to the measuring network 44. As shown in FIG. 4, empty capacitor 94 is connected to the output from the collector 52 of multivibrator 40 in parallel with the tank capacitor 46. Diode 90 is connected between the other end of empty capacitance 94 and ground in opposite direction to that of diode 70. Diode 92 is connected between the last mentioned end of the empty capacitor 94 and the upper end of capacitor 74 in opposite direction to that of diode 72. Potentiometer 80 is connected in parallel to the capacitor 74 and in series with the meter 84. Because of the oppositely connected diodes in the empty balancing network 48, when empty capacitance 94 equals the value of the tank capacitance 46, the net input to capacitor 74 will be zero. Potentiometer 80 can be adjusted initially in the empty state to compensate for the empty capacitance value of tank capacitor 46.

The diode drop changes due to temperature will tend to cancel at the empty condition and will cause approximately a 10 percent error at temperature extreme variations. However, almost all of the variations resulting from temperature changes are predictable and it is, therefore, possible to include a thermistor network which will reduce the effect of temperature variations. As is evident from the circuitry of FIG. 4, the frequency and peak amplitude of the output from the multivibrator do not affect the zero reading of the system but will merely affect the system scale factor which can be adjusted for. Furthermore, pulse width and pulse shape, within reasonable limits, do not at all affect the accuracy. Low impedance between the tubes surrounding the tank capacitor 46 and ground will provide no effect on the reading of the system. On the other hand, a high impedance between the tube and the ground will merely affect the scale but not the accuracy of the system. Once the empty adjustment has been made prior to insertion of the probe into the fuel tank, no further readjustment is necessary to the potentiometer 80. Because of the use of the zener diode 68 which serves as a regulator, the probe cannot be damaged by incorrect wiring or sudden changes in the supply vOltage. The only connections which are required between the probe and external units are the connection to the DC supply voltage and the connection to the indicator. A ground wire is required and can be provided by using the tube or frame of the probe as the ground.

Figure 5:
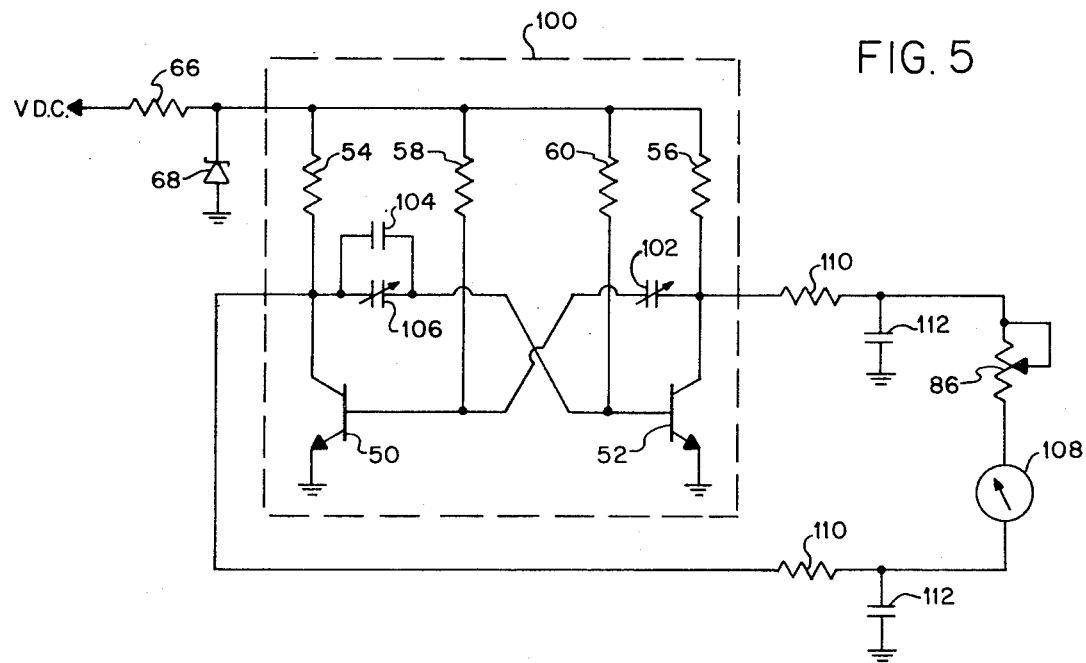
FIG. 5 is a further embodiment of the measuring electronics incorporated within the probe unit in accordance with this invention.

Referring to FIG. 5, there is shown an alternate embodiment of the electronic circuitry which is connected as part of the probe unit for providing the conversion of the probe capacitance value to a DC value for external display on an indicator. The electronic measuring system includes a high frequency, free running multivibrator 100 similar to that shown in FIG. 4 at 40. In this embodiment, however, the tank capacitor 102 is connected as one side of the RC connection between the two transistors of the multivibrator. The capacitor in the other cross connection includes a fixed capacitor 104 and an empty adjust capacitor 106. An indicator 108 is connected as a differential voltmeter between the respective collector outputs of the multivibrator. Parallel RC circuits including series resistor 110 and parallel capacitance 112 are respectively connected between the collector outputs of the multivibrator and the indicator 108. A full scale adjust 86 is connected in series with the indicator 108 as was described in FIG. 4. Similarly, a supply voltage $V_{DC}$ is supplied through the multivibrator across resistor 66 and zener diode 68 as was described with respect to FIG. 4. As is known in the art, the time duration of the respective high and low states of the output of the multivibrator is a function of the RC time constant connected to the respective collectors of the multivibrator. Initially, in the empty state capacitor 106 is adjusted to equal that of 102, whereby the time duration of the high and low state pulses are equal and the voltage differential indicator 108 will indicate a zero value. As the level of the liquid in the fuel tank changes, the capacitance of tank capacitor 102 will also change thereby providing for a longer duration at the low state of the multivibrator. The differential volmeter 108 will thereby detect a change and readout the change as a function of the quantity of fuel.

In the embodiment shown in FIG. 5, the accuracy of the system is not affected by the frequency of the multivibrator output. The voltage does not affect the zero adjust; however, the scale will be directly proportional to the voltage. Any probe leakage is effectively in parallel with the base resistor and does not change the readout of the system. Low impedance between the probe tube and ground will only affect the scale and zero but will not affect the accuracy of the system.

When a plurality of probes are provided, each in a different fuel tank, the output from each of the probes can be jointly summed at either the indicator or can be summed individually at each probe. A single DC supply can be used by all of the probes as a supply voltage.

Figure 3:
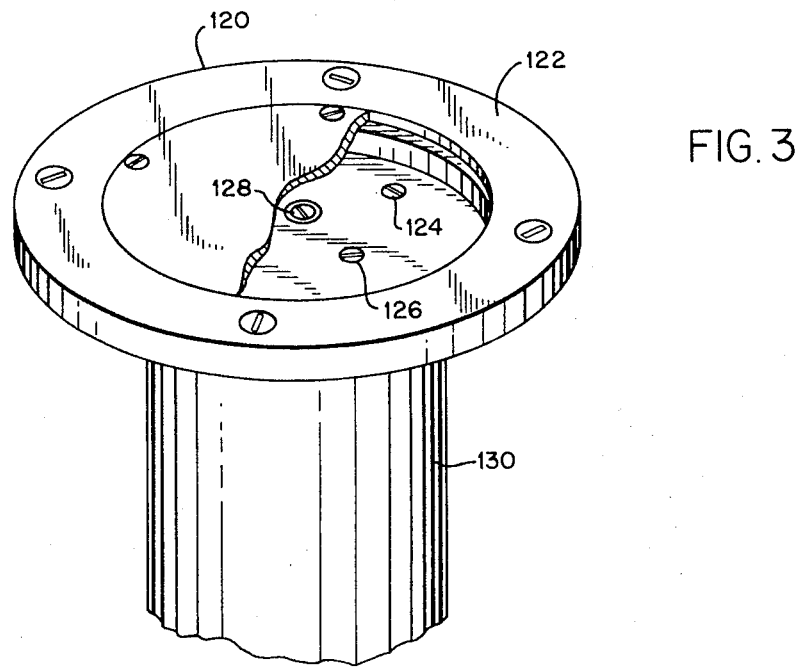
FIG. 3 represents one embodiment of the probe unit in accordance with this invention.

Referring to FIG. 3, there is shown an embodiment of the physical structure of the mounting section of the probe unit. The upper section 120 includes a case unit with a flange 122 for mounting the probe unit on to the fuel tank. Enclosed within the casing 120 is the electronic circuitry of that shown in FIG. 4 or FIG. 5 and can be included on a printed circuit board including miniaturized electronic components. Terminals 124 and 126 are provided for the external connection to the voltage supply and the indicator. Screw adjust 128 is connected to the empty capacitor on the printed circuit board initially compensating for the empty state of the probe. The tube 130 extends from the upper portion and includes the tank capacitor which is inserted directly into the fuel tank.

It will be understood that other packaging designs could be provided for containing the electronic circuitry directly in integral relationship with the probe unit.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A capacitance fuel gage device comprising a probe, at least part of which is to be immersed in the fuel, said probe including:
   a. a first capacitor, the capacitance of which is a function of the level of said fuel;
   b. electronic circuitry, including a high frequency, free running astable multivibrator whose output is connected to one side of said first capacitor; first and second oppositely poled diodes each having a side connected to the other side of said first capacitor, the first of which has its other side connected to ground; a second capacitor connected between the other side of the second diode and ground;
   c. first terminal means adapted to be connected to an external DC supply means for energizing said electronic circuitry; and
   d. second terminal means at the other side of said second diode adapted to be connected to an external indicator means.

2. A device as in claim 1 wherein said indicator is an ammeter.

3. A device as in claim 1 wherein said probe further includes variable resistance means connected between said electronic circuitry and said second terminal means.

4. A device as in claim 1 further including full scale adjustment means connected to said second terminal means.

5. A device as in claim 1 wherein said electronic circuitry further includes a zener diode connected so as to be in parallel with said DC supply means.

6. A device as in claim 1 and wherein said probe is connected to ground.

7. A device as in claim 1 and wherein said electronic circuitry further includes a third capacitor whose one side is connected to said output from said multivibrator in parallel with said first capacitor; a third diode connected between the other side of said third capacitor and ground; a fourth diode connected between said other side of said third capacitor and said other side of said second diode, and a variable resistor connected between said other side of said second diode and said first terminal means, each of said third and fourth diodes respectively connected in opposition to said first and second diodes.

8. A capacitance fuel gage device comprising, a probe, at least part of which is to be immersed in the fuel, said probe including:
   a. a first capacitor, the capacitance of which is a function of the level of said fuel;
   b. electronic circuitry, including a high frequency, free running astable multivibrator having first and second outputs, said first capacitor being connected into the multivibrator to form one side of the capacitive interconnection therein, and a second variable capacitor connected into the multivibrator to form the other side of said capacitive interconnection therein for zero adjustment of said probe;
   c. first terminal means adapted to be connected to an external DC supply means for energizing said electronic circuitry; and
   d. second and third terminal means connected respectively to the outputs of said multivibrator adapted for connection therebetween of a differential voltmeter.

9. A device as in claim 8 and wherein said electronic circuitry further includes a zener diode connected so as to be in parallel with said DC supply means.

* * * * *